F. WINKLER.
BALL RETAINER.
APPLICATION FILED MAR. 5, 1915.

1,172,858.  Patented Feb. 22, 1916.

Witnesses

Inventor

UNITED STATES PATENT OFFICE.

FRANZ WINKLER, OF SCHWEINFURT, GERMANY.

BALL-RETAINER.

1,172,858.

Specification of Letters Patent.

Patented Feb. 22, 1916.

Application filed March 5, 1915. Serial No. 12,343.

*To all whom it may concern:*

Be it known that I, FRANZ WINKLER, a subject of the King of Bavaria, residing at Schweinfurt, in Bavaria, Germany, have invented new and useful Improvements in Ball-Retainers, of which the following is a specification.

This invention relates to a ball-retainer for ball-bearings, and more especially for journal-bearings, and the object of the invention is to provide an integral ring member having special means for guiding the series of balls in line and means for yieldingly spacing the balls apart and also retaining them in ball-pockets recessed in the ring member. These objects are attained by the provision of parallel flanges upon the edges of the substantially cylindrical retainer-ring proper and lips or tongues extending from the edges of the ball-pockets, said lips embracing the balls and some of same being the spacing means. These lips are located between, and protected by said flanges. Owing to the perfect guiding of the balls, the retainer is advantageously applicable in ball-bearings having conical, cylindrical, or spherical race ways as well as in those with race grooves. Moreover the retainer ring is supported by the balls in the ball-bearing in concentrical position.

In the accompanying drawing which is to be considered as a part of this specification, a ball-retainer constructed in accordance with the invention is represented by way of example.

Figure 1:
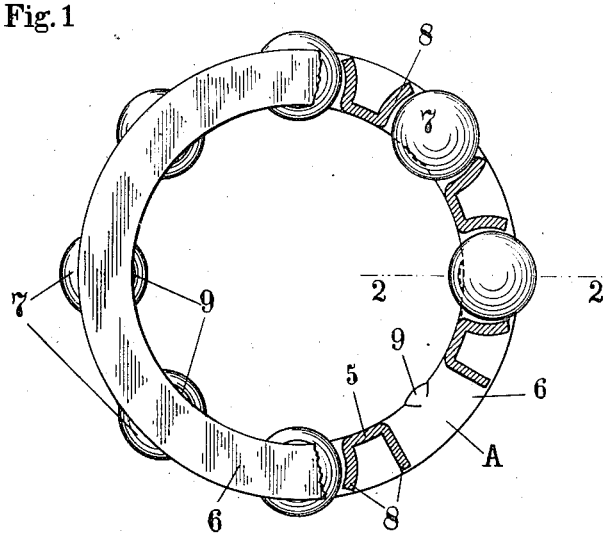
Figure 2:
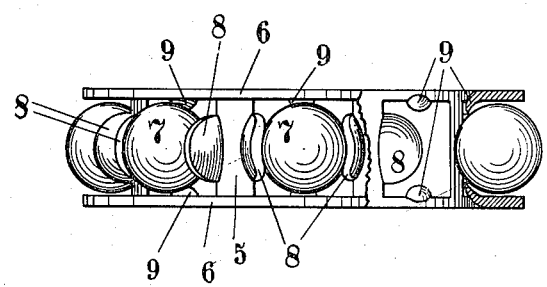

Figure 1 illustrates a side-view of the retainer and partially a sectional elevation on the middle plane of the structure vertical to the axis. Fig. 2 shows a peripheral view of the retainer and a cross-section on the line 2 to 2 of Fig. 1.

Like numerals designate like parts in both figures of the drawing.

The ball-retainer according to the embodiment of the invention illustrated in the drawing comprises a substantially cylindrical body 5 and flanges 6 projecting from the ends of the former outwardly in substantially parallel planes. These flanges may be integral with the body 5 or attached thereto by soldering, brazing, riveting or otherwise. The said elements form a ring-member of U-shaped cross-section and can be manufactured from a thick ring by milling out or by bending it from a blank of sheet metal or a sleeve.

The cylindrical body 5 is recessed with perforations, each disposed for receiving a ball 7 and which are of square or any other convenient shape. Any suitable method of forming said perforations can be applied, for example, they are cut or stamped out, whereby at the same time lips or tongues are produced some of which are erected upon the outer periphery of the body 5, while others are bent inwardly. In this construction two larger tongues 8 are directed outwardly from the edges which confine the perforations in the circumferential direction; they are preferably hollowed out according to the spherical face of the balls and bent to overhang and embrace the balls located in the perforations. Smaller tongues 9 extend from those edges of the perforations which are adjacent to the flanges 6, toward the center of the ring and also across the perforation, so that they support the balls on the inner side of the ring against falling out. The balls received in said perforations or pockets project over the outer and inner edges of the flanges 6 to such a degree that they can contact with the races of the bearing; they must project more with the use in grooved bearing rings, and less when working on flat race-ways. It is also possible to invert the elements of the construction, that is to say, to dispose the cylindrical ring-member outwardly and make the flanges to project inwardly, the same being effected with respect to the tongues 8 and 9. This modification can easily be understood, and its illustration can therefore be dispensed with.

After the perforations, and contemporaneously the tongues 8 and 9, have been made by cutting out in the ring 5, these tongues can be preliminarily bent in opposite directions, as shown in connection with the ball-pocket A in Fig. 1, and then contracted to an inclined position around the ball inserted, by the use of a convenient tool. However the tongues can also be hollowed out before their bending up, while the balls may be pressed between them, provided that they possess a sufficient resiliency to spring back and grip the balls.

The special construction of the retainer renders the operation of the ball-bearing very satisfactory, as the series of the balls is perfectly guided in line between the flanges, while each ball is yieldingly held in circumferential relation by the tongues 8 which tend to return the balls to their normal position. Notwithstanding a certain free play is allowed the balls in the pockets. Thus the said tongues are not only the spacing-means but also serve the purpose to support the retainer upon the balls and maintain it in concentrical position in the bearing. Moreover, the retainer is easy in manufacture, strong in construction and effective in the operation.

Since the invention can be embodied in different ways, as disclosed in the foregoing specification, I do not wish to be limited to the described constructional examples, but What I broadly claim as my invention, is—

1. A retainer for ball-bearings comprising a ring-shaped member provided with ball-receiving perforations, flanges projecting radially from said ring member, and tongues projecting from said ring member adjacent said perforations approximately radially to the axis of the ring; said tongues being arranged in pairs and having their opposed faces spherically concaved to form seats for balls adapted to be retained therebetween and means for retaining said balls in place.

2. A retainer for ball-bearings comprising a ring-shaped member provided with ball-receiving perforations, flanges projecting radially from said ring member, a series of ball retaining tongues projecting from said ring member approximately radially to the axis of the ring, and a second series of tongues projecting from said end flanges and extending in a direction substantially at right angles to the first mentioned series of tongues, certain tongues of one series being adapted in conjunction with certain tongues of the other series, to retain a ball in position within said retainer.

3. A retainer for ball-bearings comprising a ring-shaped member having a series of ball-receiving apertures provided therein, flanges projecting radially from said member, a series of tongues extending from said ring-shaped member and arranged in pairs adjacent each ball receiving aperture, the opposed faces of said tongues being concave and conforming approximately to the curvature of a ball adapted to be seated therebetween, and a second series of tongues projecting from said end flanges at an angle thereto and in a direction opposite to said first mentioned tongues and adapted to retain the balls seated between said first mentioned tongues in place, substantially as described.

4. A retainer for ball-bearings, comprising a ring-shaped member provided with a number of ball-receiving perforations, radial flanges projecting from the edges of said ring member in substantially parallel planes, means disposed around the said perforations approximately radially to the axis of the ring so as to form pockets adapted to receive the balls and independent means carried by said ball retainer for retaining the balls seated in said pockets.

In testimony whereof I have signed my name to this specification in the presence of two subscribing witnesses.

FRANZ WINKLER.

Witnesses:
 OSCAR BOCK,
 RALPH DOX.

Copies of this patent may be obtained for five cents each, by addressing the "Commissioner of Patents, Washington, D. C."